United States Patent
Bullinger et al.

(10) Patent No.: US 6,768,962 B2
(45) Date of Patent: Jul. 27, 2004

(54) METHOD FOR SENSING THE READINESS OF A DRIVER TO STEER

(75) Inventors: Wilfried Bullinger, Korntal-Muenchingen (DE); Florent Paviot, Filderstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/260,339

(22) Filed: Oct. 1, 2002

(65) Prior Publication Data

US 2003/0088352 A1 May 8, 2003

(30) Foreign Application Priority Data

Oct. 1, 2001 (DE) .......................................... 101 48 535

(51) Int. Cl.[7] .............................................. G01L 11/00
(52) U.S. Cl. ....................................... 702/139; 701/41
(58) Field of Search ............................... 180/272, 287; 340/525, 576; 455/411; 600/300, 517; 701/1, 41; 702/139

(56) References Cited

U.S. PATENT DOCUMENTS

| | | | | |
|---|---|---|---|---|
| 3,585,626 A | * | 6/1971 | Tartarini | ..................... 180/272 |
| 4,210,905 A | * | 7/1980 | Coons | ........................ 340/575 |
| 5,874,892 A | * | 2/1999 | Antonellis et al. | .......... 340/438 |
| 5,969,616 A | * | 10/1999 | Tschoi | ........................ 340/576 |

FOREIGN PATENT DOCUMENTS

DE     198 02 249 C2     9/1999

* cited by examiner

*Primary Examiner*—John Barlow
*Assistant Examiner*—Stephen J. Cherry
(74) *Attorney, Agent, or Firm*—Crowell & Moring LLP

(57) ABSTRACT

The invention relates to a method for sensing the readiness to steer or the steering behavior of the driver of a motor vehicle, at least one pressure and/or contact sensor which supplies an electrical signal when it is touched and/or pressure is exerted being integrated into the steering wheel or mounted on the steering wheel. The pressure sensor and/or contact sensor has a multiplicity of sensor elements or segments arranged along the circumference of the steering wheel. Each of the sensor elements or sensor segments has, in the cross section of the steering wheel rim, a multiplicity of pressure-sensitive and/or contact-sensitive zones so that it is possible to detect whether the driver's hand grasps the steering wheel from the inside, outside, top or bottom. A signal which represents the readiness to steer can be used to generate in an evaluation unit, for example, an audible, optical, haptic or similar warning to the driver as a function of the travel situation at a particular time or the events on the road detected around the vehicle.

12 Claims, 2 Drawing Sheets

METHOD FOR SENSING THE READINESS OF A DRIVER TO STEER

BACKGROUND OF THE INVENTION

The present invention relates to a method for sensing the readiness to steer or the driving behavior of a driver, and a method for generating adaptive warning times.

The invention relates in particular to a method for sensing the readiness to steer or the steering behavior of the driver of a motor vehicle, at least one pressure and/or contact sensor which supplies an electrical signal when it is touched and/or pressure is exerted being integrated into the steering wheel of the vehicle or mounted on the steering wheel.

A device is described in DE 198 02 249 C2 to regulate the travel speed of a vehicle. The sensing of the readiness to steer is, however, not sensed.

In known driver assistance systems, for example cruise controller with distance control, cornering warning systems or automatic lane detection or lane guidance systems there are often critical situations in which the driver is warned or must very quickly assume control of the vehicle himself again.

This is usually carried out in the known systems by an audible warning signal. The prewarning time or the warning intensity is usually a constant variable and is not adapted to the degree of attentiveness or readiness of the driver to act. This has the disadvantage that in many situations the warning comes too late or in many situations too early, which the driver experiences as an attempt to relieve him of control.

SUMMARY OF THE INVENTION

An object of the invention is to provide a method which can be used to determine the readiness to steer or the steering behavior of the driver. Furthermore, the driver is to be warned of imminent dangers as a function of her readiness to steer. The intention is thus to be able to increase the attentiveness of the driver as a function of the situation.

This object has been achieved according to the invention by the pressure sensor and/or contact sensor has a multiplicity of sensor elements or sensor segments arranged along the circumference of the steering wheel. Each of the sensor elements or sensor segments has, in the cross-section of the steering wheel rim, a multiplicity of pressure-sensitive and/or contact-sensitive zones so that it is possible to detect whether the driver's hand grasps the steering wheel from the inside, outside, top or bottom.

The readiness of the driver to steer can easily be determined with this simple but effective measure.

The position and the pressure of the hands at a particular time can be evaluated, and a signal or coefficient which represents the readiness of the driver at a particular time to execute a necessary steering movement can be evaluated.

According to one particularly advantageous currently contemplated embodiment, this signal or coefficient can be used in an evaluation unit to generate, for example, an audible, optical, haptic or similar warning to the driver as a function of the travel situation at a particular time or the events on the road detected around the vehicle.

The timing of the generation of the warning can be dependent on the readiness of the driver at a particular time to execute a necessary steering movement.

Alternatively, or additionally, the warning can be generated as a function of the driver type which is derived as a further signal variable or coefficient by a relatively long measurement and chronological statistical evaluation or formation of mean values.

The pressure with which the driver grasps the steering wheel can be determined by the pressure and/or contact sensor, as a result of which a pressure signal is generated by the evaluation unit.

Finally, there is provision for the pressure signal to be used to actuate vehicle-mounted vehicle-occupant protection and/or driver assistance systems which prevent or reduce an accident. Such systems are equipped with sensors for sensing the surroundings, for example cameras, radar, etc., and/or actuators for influencing the lateral movement and/or longitudinal movement for a steering or braking intervention.

BRIEF DESCRIPTION OF THE DRAWING

These and other objects, features and advantages of the present invention will become more readily apparent from the following detailed description of currently preferred configurations thereof when taken in conjunction with the accompanying drawings wherein.

DETAILED DESCRIPTION OF THE DRAWING

Figure 1:
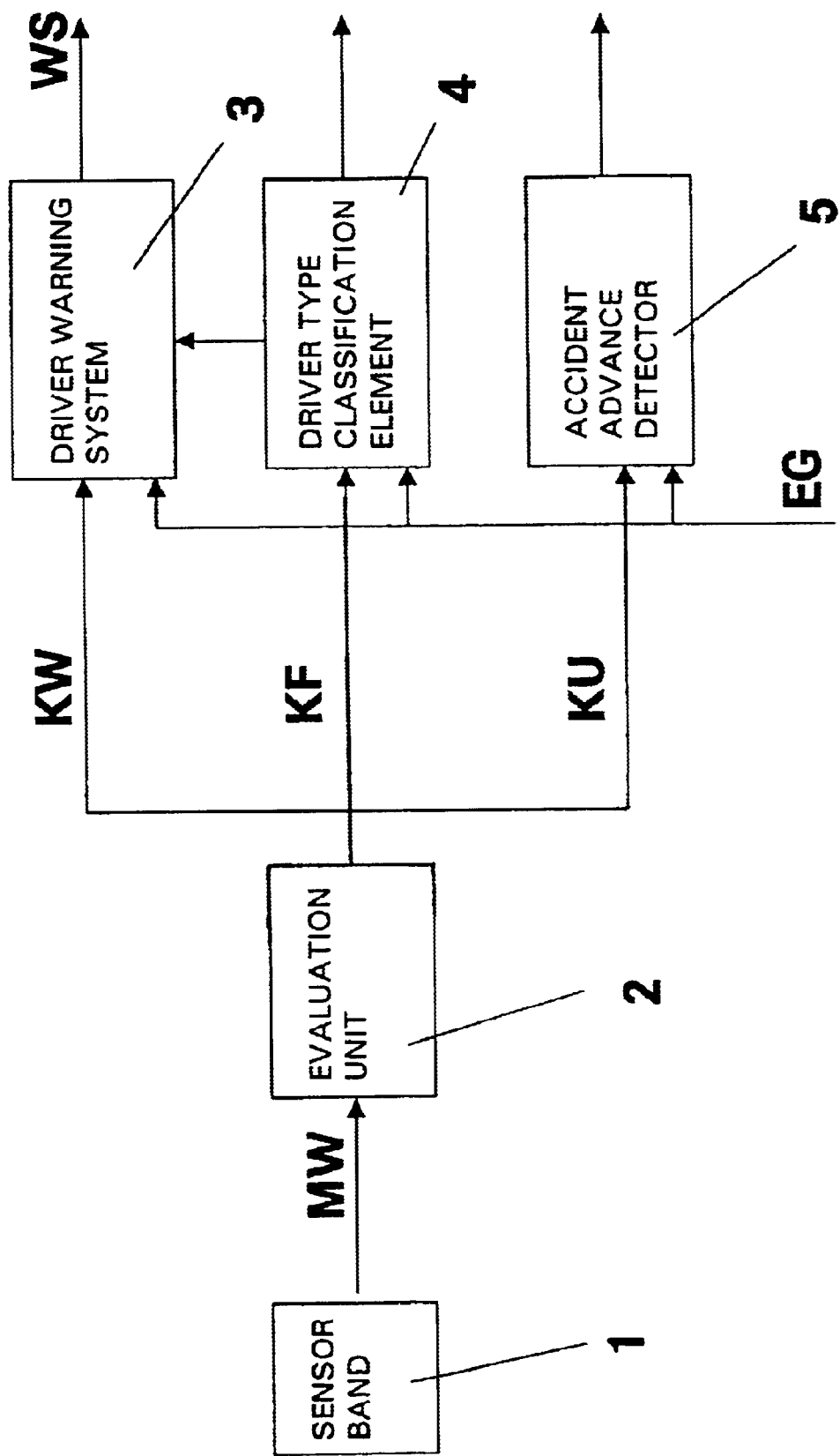
FIG. 1 is a schematic diagram which illustrates how the method according to the invention functions.
Figure 2:
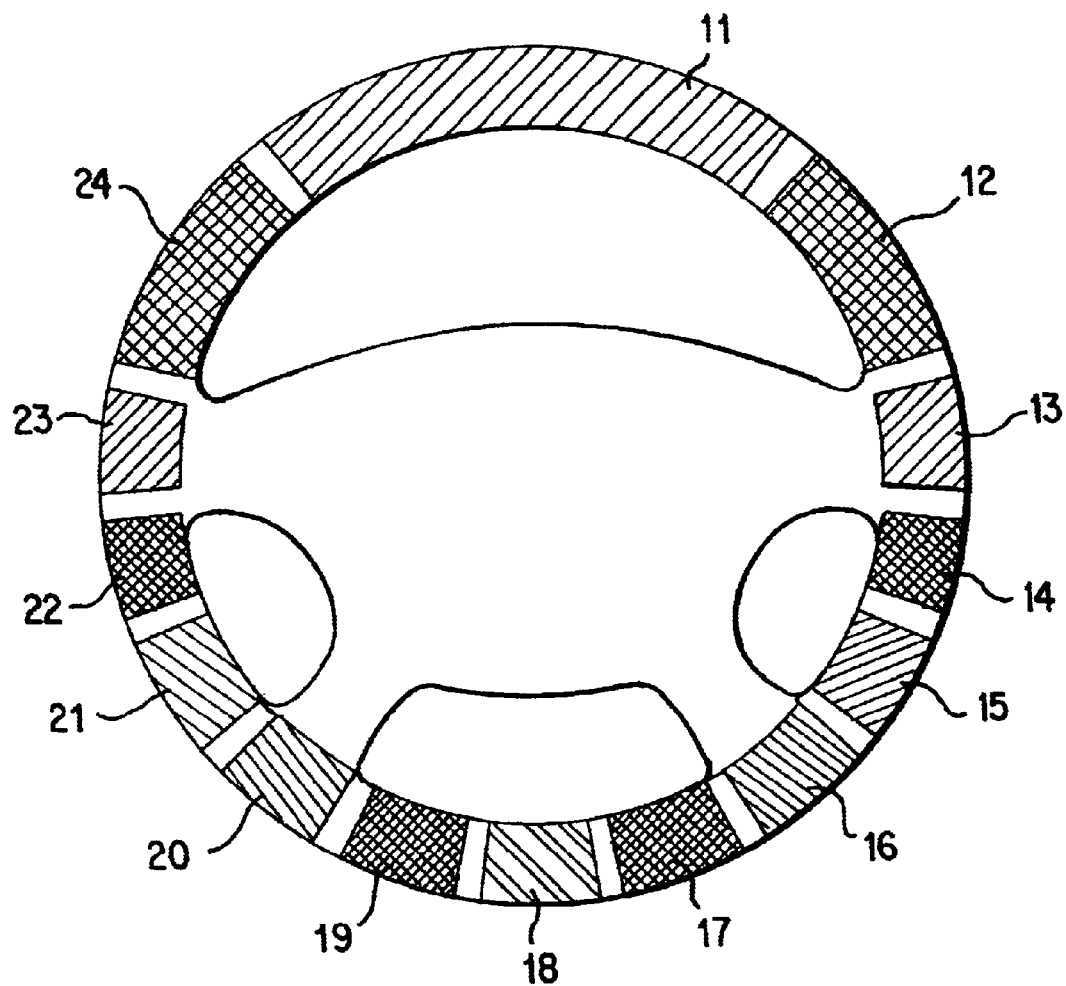
FIG. 2 is a schematic showing of a steering wheel with one contemplated arrangement of sensors in accordance with the present invention.

A segmented sensor band 1 which is arranged on a steering wheel shown in FIG. 2 and having sensor segments 11 through 24 generates a measured value MW which represents the grasping position of the driver's hands. A coefficient for the warning time TW which is output to a driver warning system 3 shown in FIG. 1, a coefficient for the driver type KF which is output to a driver type-classification element 4, and a coefficient for accident probability KU which is output to an element 5 for detecting accidents in advance, are generated in an evaluation unit 2. The driver warning system 3 outputs a warning signal WS with adaptive warning time to the driver.

An advantage of the present invention is that a warning can be chronologically adapted to the readiness to steer at a particular time, and thus also ultimately to the attentiveness of the driver at a particular time.

A pressure-sensitive and/or contact-sensitive sensor in the form of a film or a sensor band 1 is integrated into the steering wheel, as described, for example, in DE 198 02 249 C2 corresponding to EP 930 192 A2, laid-open on Jul. 21, 1999. The sensor band 1 measures the position of the driver's hands and/or the pressure with which the driver grasps the steering wheel. In contrast to the pressure sensor used in DE 198 02 249, which is composed of a single element, the invention uses a sensor element (not illustrated) which is divided into a plurality of segments so that it is possible to localize the position where the pressure is applied or the contact by the hands takes place. Typically, approximately 7–12 segments are necessary along the circumference of the steering wheel. Each segment must have in turn a plurality of, preferably four, sensitive zones in the cross section of the rim of the steering wheel so that it is possible to detect whether the driver's hand grasps the steering wheel from the inside, outside, top or bottom.

The position and the pressure of the hands at a particular time are evaluated and a signal MW which represents the readiness of the driver at a particular time to execute a fast steering movement is generated. This signal/coefficient MW can then be used in the evaluation unit 1 to determine, for example, a warning sound or some other warning to the driver and its time. Of course, other signals present in the vehicle can also be used for this.

If, for example, the driver grasps the steering wheel in the lower region with just one hand or his fingers, in an emergency he requires further time until he can properly grasp the steering wheel with both hands in order to carry out an avoidance maneuver. In this case, the evaluation unit 1 would predefine a relatively long warning time KW. Conversely, if the driver has the steering wheel firmly in his grasp, a relatively short prewarning time KW is sufficient.

Furthermore, an additional signal variable KF relating to the driver type (compulsive, laid-back, careful or the like), which is additionally used for the evaluation for determining the warning time, can also be derived by way of a relatively long measurement and chronological statistical evaluation/formation of mean values (in the region of several minutes).

The present invention also provides a further possibility. That is, a possible hazardous situation or an imminent accident can be detected shortly beforehand by monitoring the pressure with which the driver grasps the steering wheel. Experience has shown that when a collision can be anticipated a driver attempts to hold the steering wheel tightly, which the built-in pressure sensor detects through a rise in pressure. This signal or this coefficient KU can actuate reversible vehicle-occupant protection systems which are, for example, to be triggered in advance in conjunction with other signals EG (for example brake booster) present in the vehicle.

Although the present invention has been illustrated and described with respect to exemplary embodiment thereof, it should be understood by those skilled in the art that the foregoing and various other changes, omission and additions may be made therein and thereto, without departing from the spirit and scope of the present invention. For example, the number of sensor segments may vary from those illustrated depending upon the resolution desired or acceptable. Therefore, the present invention should not be understood as limited to the specific embodiment set out above but to include all possible embodiments which can be embodied within a scope encompassed and equivalent thereof with respect to the feature set out in the appended claims.

We claim:

1. Method for sensing a readiness to steer or a steering behavior of a motor vehicle driver, comprising supplying an electrical signal when the driver touches or exerts pressure on at least one sensor which is integrated into a steering wheel of a motor vehicle or mounted on the steering wheel and is provided with a multiplicity of one of sensor elements and sensor segments arranged along a circumference of the steering wheel, and detecting at least where the driver's hand grasps the steering wheel at a predetermined position from inside, outside, top or bottom thereof via each of the sensor elements or sensor segments which has, in a cross-section of a rim of the steering wheel, contact-sensitive zones.

2. Method according to claim 1, further comprising evaluating position and pressure of the driver's hands at a particular time, and generating a signal or coefficient which represents the readiness of the driver at the particular time to execute a necessary steering movement.

3. Method according to claim 2, further comprising supplying the signal or coefficient to an elevation unit to generate at least one of an audible, optical, haptic or warning signal to the drive as a function of the travel situation at the particular time or as a function of the events on the road detected around the vehicle.

4. Method according to claim 3, wherein timing of the warning generation is made dependent on readiness of the driver at the particular time to execute a necessary steering movement.

5. Method according to claim 3, wherein the warning is generated as a function of driver type which is derived as a further signal variable or coefficient via a relatively long measurement and chronological statistical evaluation or by formation of mean values.

6. Method according to claim 5, wherein timing of the warning generation is made dependent on readiness of the driver at the particular time to execute a necessary steering movement.

7. Method according to claim 1, further comprising determining the pressure with which the driver grasps the steering wheel via at least one of the pressure and contact sensor, and generating a pressure signal by the evaluation unit as a result thereof.

8. Method according to claim 7, wherein the pressure signal is used to actuate at least one of vehicle-mounted vehicle-occupant protection and driver assistance systems to prevent or reduce likelihood of an accident.

9. Method according to claim 7, further comprising evaluating position and pressure of the driver's hands at a particular time, and generating a signal or coefficient which represents the readiness of the driver at the particular time to execute a necessary steering movement.

10. Method according to claim 9, further comprising supplying the signal or coefficient to an evaluation unit to generate, for example, at least one of an audible, optical, and haptic or similar warning to the driver as a function of the travel situation at the particular time or as a function of the events on the road detected around the vehicle.

11. Method according to claim 10, wherein timing of the warning generation is made dependent on readiness of the driver at the particular time to execute a necessary steering movement.

12. Method according to claim 9, wherein the warning is generated as a function of driver type which is derived as a further signal variable or coefficient via a relatively long measurement and chronological statistical evaluation or by formation of mean values.

* * * * *